(12) United States Patent
König et al.

(10) Patent No.: US 9,206,822 B2
(45) Date of Patent: Dec. 8, 2015

(54) DEVICE FOR MONITORING THE POSITION AND MOVEMENT OF A BRAKE PEDAL

(75) Inventors: Harald König, Ober-Mörlen (DE); Manfred Rüffer, Sulzbach (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 398 days.

(21) Appl. No.: 13/990,105

(22) PCT Filed: Jul. 27, 2011

(86) PCT No.: PCT/EP2011/062899
§ 371 (c)(1),
(2), (4) Date: May 29, 2013

(87) PCT Pub. No.: WO2012/072281
PCT Pub. Date: Jun. 7, 2012

(65) Prior Publication Data
US 2013/0247557 A1    Sep. 26, 2013

(30) Foreign Application Priority Data
Nov. 30, 2010    (DE) .......................... 10 2010 062 163

(51) Int. Cl.
*B60T 11/18*    (2006.01)
*F15B 15/20*    (2006.01)
(Continued)

(52) U.S. Cl.
CPC ................ *F15B 15/20* (2013.01); *B60Q 1/441* (2013.01); *B60T 7/042* (2013.01); *B60T 11/18* (2013.01); *B60T 13/52* (2013.01); *B60T 17/22* (2013.01)

(58) Field of Classification Search
CPC .......... B60T 7/042; B60T 13/52; B60T 17/22
USPC .............................................. 60/534
See application file for complete search history.

(56) References Cited

U.S. PATENT DOCUMENTS 5,224,410 A * 7/1993 Graichen et al. .................... 91/1
5,261,312 A * 11/1993 Bornemann et al. ......... 91/376 R
(Continued)

FOREIGN PATENT DOCUMENTS

DE        39 39 978 A1    6/1991
DE        40 11 165 A1   10/1991
(Continued)

OTHER PUBLICATIONS

International Search Report for PCT/EP2011/062899 mailed Apr. 10, 2012.
German Search Report for PCT 10 2010 062 163.3 dated Feb. 8, 2011.

*Primary Examiner* — Thomas E Lazo
(74) *Attorney, Agent, or Firm* — RatnerPrestia

(57) ABSTRACT

A device for monitoring the position and movement of a brake pedal for motor vehicles, including a power assist brake actuating unit. The brake actuating unit having a master cylinder fastened to the brake power assist unit, a housing and at least one piston displaceable in a linear manner in the master cylinder, and a position indicator for monitoring the position of the brake pedal. The position indicator transmits signals to a sensor element connected to an electronic control unit. The position indicator is provided on a support coupled to the movement of the control valve housing or to the movable wall that is supported by the control valve housing. The support is guided in a housing of a sensor element, and the housing of the sensor element penetrates in a vacuum-tight manner the power assist unit housing and the housing of the master cylinder having a first housing section.

13 Claims, 3 Drawing Sheets

(51) Int. Cl.
*B60Q 1/44* (2006.01)
*B60T 7/04* (2006.01)
*B60T 13/52* (2006.01)
*B60T 17/22* (2006.01)

(56) References Cited

U.S. PATENT DOCUMENTS

2004/0155647 A1 8/2004 Green et al.
2004/0160119 A1* 8/2004 Wagner et al. ............. 303/114.3
2010/0251848 A1* 10/2010 Drott et al. ..................... 74/514

FOREIGN PATENT DOCUMENTS

| | | |
|---|---|---|
| DE | 41 16 779 A1 | 11/1992 |
| DE | 44 10 699 A1 | 10/1995 |
| DE | 197 51 519 A1 | 5/1999 |
| DE | 102 18 972 A1 | 2/2003 |
| DE | 102 30 865 A1 | 2/2004 |
| DE | 103 23 655 A1 | 4/2004 |
| DE | 10 2004 031 815 A1 | 3/2005 |
| DE | 10 2005 059 747 A1 | 12/2006 |

* cited by examiner

DEVICE FOR MONITORING THE POSITION AND MOVEMENT OF A BRAKE PEDAL

CROSS REFERENCE TO RELATED APPLICATIONS

This application is the U.S. National Phase Application of PCT/EP2011/062889, filed Jul. 27, 2011, which claims priority to German Patent Application No. 10 2010 062 163.3, filed Nov. 30, 2010, the contents of such applications being incorporated by reference herein.

BACKGROUND OF THE INVENTION

Devices for monitoring the positions and movements of a brake pedal are generally known.

DE 10 2008 020 A1, which is incorporated by reference, discloses by way of an example a master cylinder arrangement having a piston, in which arrangement the piston is permanently coupled to a position sensing rod in order for the two parts to move in conjunction with one another. The rod is guided in a displaceable manner in a guide shaft in the cylinder housing, which guide shaft extends parallel to a first cylinder bore and comprises a position sensing member for sensing the position of said rod by means of a position measuring sensor.

Furthermore, a brake power assist unit having a tensioning bolt and an integrated device for switching a brake light is disclosed in DE 103 23 655 A1, which is incorporated by reference, which device comprises a sensor or switch that is fixed relative to the brake power assist unit, which sensor or switch derives a switching signal in response to a displacement of the membrane disk relative to the tensioning bolt. A further embodiment of DE 103 23 655 A1 describes a sensor that is fixed in a sealed manner in a receiving device, wherein the receiving device comprises an electronic module and a mechanical module. The mechanical module receives a telescopic sensing device for the membrane disk.

The known devices are regarded as disadvantageous with regards to the assembly process and the number of components.

SUMMARY OF THE INVENTION

Therefore, an aspect of the invention provides a different device for monitoring the positions and movements of a brake pedal, which device is simple to assemble and comprises a reduced number of components.

This aspect is achieved in accordance with the invention by means of a device for monitoring the position and movement of a brake pedal for use within a servo-controlled brake system for motor vehicles, comprising a brake actuating unit having a brake power assist unit having a power assist unit housing that is divided into at least one vacuum chamber and at least one working chamber by means of at least one axially movable wall that can be influenced by a pneumatic differential pressure, wherein the movable wall is embodied as a membrane disk that is supported on a control valve housing and as a membrane that lies on said membrane disk, and said brake actuating unit having a master cylinder that is fastened to the brake power assist unit and comprises a housing and at least one piston that can be displaced in a linear manner within said master cylinder, and a position indicator for monitoring the position of the brake pedal, which position indicator transmits signals to a sensor element that can be connected to an electronic control unit, wherein the position indicator is provided on a support that is coupled to the movement of the control valve housing or to the movable wall that is supported by the control valve housing, which support is guided in a housing of a sensor element, and wherein the housing of the sensor element penetrates in a vacuum-tight manner the power assist unit housing and the housing of the master cylinder having a first housing section. This results in the advantage that during a maintenance service the housing of the sensor element and the position indicator can be replaced without a large expenditure.

The ability to replace the components can be achieved in accordance with an advantageous development of the invention in a simple manner, by virtue of the fact that the housing of the sensor element is provided on the housing of the master cylinder by means of a fastening means in such a manner that it can be dismantled.

A holding pin can be provided as a fastening means in accordance with an advantageous embodiment.

For sealing purposes a sealing ring that encompasses the housing of the sensor element is preferably provided between the housing of the master cylinder and the power assist unit housing.

In accordance with an advantageous embodiment of the invention, the housing of the sensor element having a second housing section protrudes out of the brake actuating unit, wherein the sensor element is arranged in the second housing section, on which a plug connector element is formed in order to provide the connection to the electronic control unit. The sensor element can therefore be connected to the electronic control unit in a simple manner. Furthermore, the arrangement of the housing of the sensor element has proven to be optimal with regard to packaging.

It is preferred that a Hall sensor is provided as a sensor element and a magnet is provided as a position indicator. However, it is also possible to measure the position using a different method, for example an optical method or an inductive method.

In order to be able to easily compensate for the tolerances of the components, a further advantageous embodiment of the invention provides that the magnet is arranged on a first end of the support and is connected to the support by means of a pressed connection.

In accordance with an advantageous embodiment of the invention, the movement of the position indicator is coupled to the movement of the membrane disk of the movable wall.

An alternative advantageous embodiment of the invention provides that the movement of the position indicator is coupled to the movement of the control valve housing.

In this case, a further magnet can preferably be provided for coupling the movement of the position indicator, which magnet is arranged on a second end of the support and is connected to the support by means of a pressed connection. This arrangement of the further magnet additionally improves the compensation of the component tolerances.

In order to implement the coupling to the control valve housing, a metal element is provided on the control valve housing for coupling to the further magnet in accordance with an advantageous embodiment of the invention.

An alternative embodiment of the invention provides that a return spring is provided for coupling the movement of the position indicator, which return spring pre-stresses the support against the control valve housing or the movable wall that is supported by the control valve housing.

It is preferred that the return spring is supported at one end on a floor of a guide shaft of the housing of the sensor element and at the other end on the support.

BRIEF DESCRIPTION OF THE DRAWINGS

The invention is best understood from the following detailed description when read in connection with the accompanying drawing. Included in the drawings are the following figures.

DETAILED DESCRIPTION OF THE INVENTION

Figure 1:
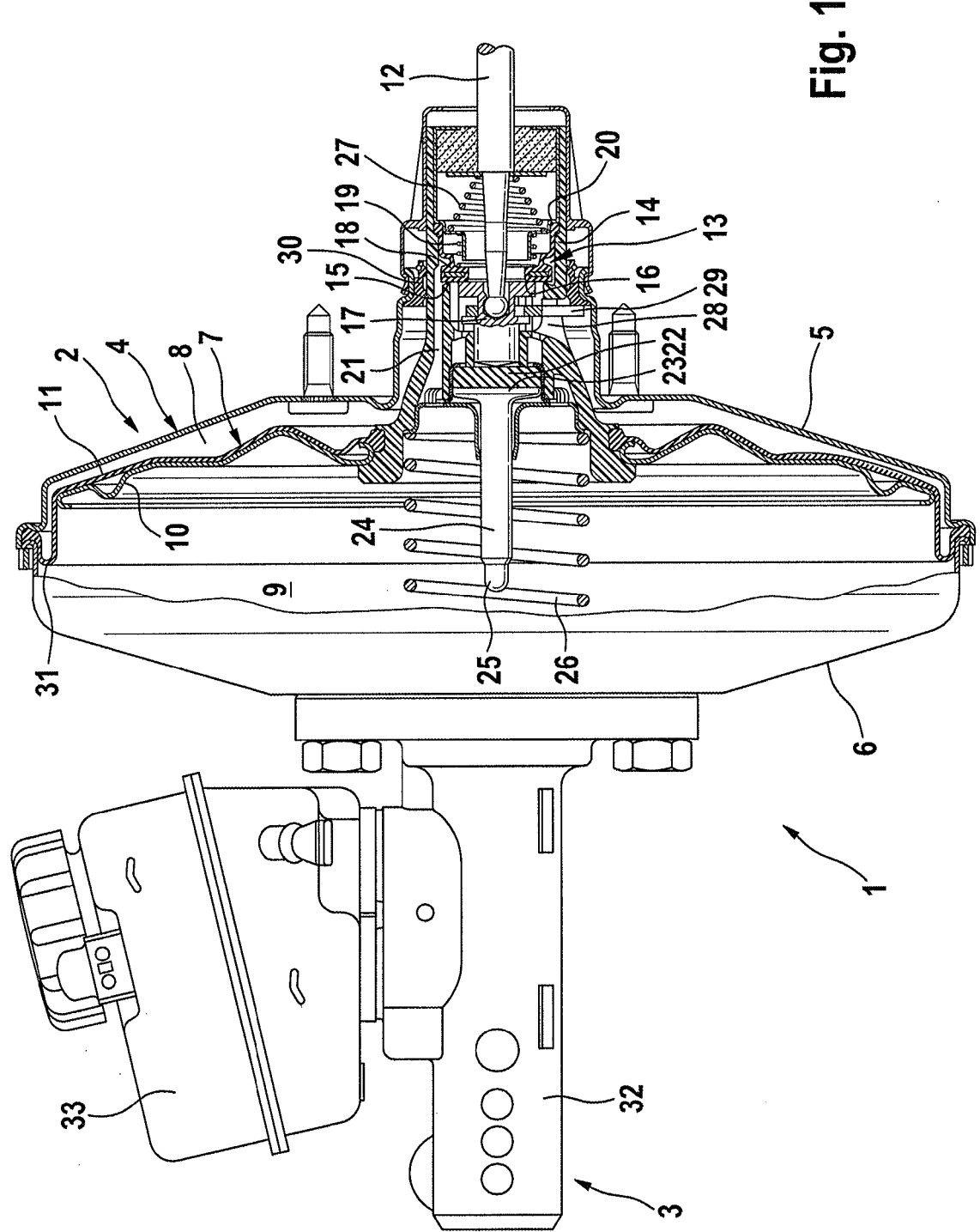
FIG. 1 illustrates a longitudinal sectional view of a known brake actuating unit.

FIG. 1 illustrates a longitudinal sectional view of a known brake actuating unit 1 having a brake power assist unit 2 and a master cylinder 3 of a motor vehicle brake system, which master cylinder is fastened to said brake power assist unit, which motor vehicle brake system can be used in an application in accordance with the invention for monitoring the positions and movements of a brake pedal.

A merely schematically indicated power assist unit housing 4 of the brake power assist unit 2 comprises a first housing half shell 5 and a second housing half shell 6, which with the aid of measures that use shaping technology, by way of an example using a lance, are pressed together in a force-fitting manner. The power assist unit housing 4 is divided into a working chamber 8 and a vacuum chamber 9 by means of an axially movable wall 7 that can be influenced by a pneumatic differential pressure. The axially movable wall 7 comprises a membrane disk 10, which is deep-drawn for example from a metal plate, and a flexible membrane 11 that lies on said membrane disk, which membrane forms a roll membrane between the outer periphery of the membrane disk 10 and the power assist unit housing 4, which roll membrane comprises a rolled fold 31 and acts as a seal to seal the two chambers 8,9 with respect to each other and to seal the two chambers 8,9 with respect to the atmosphere.

A control valve 13 that can be actuated by means of an input element 12 is housed in a control valve housing 14 which control valve housing is supporting the movable wall 7 and which control valve housing is guided in a sealed manner in the power assist unit housing 4 and said control valve comprises a first seal seat 15 that is embodied on the control valve housing 14, a second seal seat 16 that is embodied on a valve piston 17 that is connected to the input element 12, and said control valve also comprises a valve body 18 that cooperates with the two seal seats 15, 16, which valve body is pressed against the valve seats 15, 16 by means of a valve spring 19. As is evident in FIG. 1, the valve spring 19 is supported on a retaining sleeve 20 that is arranged in the control valve housing 14. The working chamber 8 can be connected to the vacuum chamber 9 by means of a duct 21 that extends laterally in the control valve housing 14.

Furthermore, the input element 12 is connected to a brake pedal, not illustrated.

The brake force is conveyed to an actuating piston of the master cylinder 3 of the brake system by way of a rubber elastic reaction disk 22 that lies at an end face side on the control valve housing 14 and a head flange 23 and a push rod that comprises a mushroom-shaped head 25, which actuating piston is installed on the vacuum-side end of the brake power assist unit 2. The input force applied to the input element 12 is conveyed to the reaction disk 22 by means of the valve piston 17.

A return spring 26 that is illustrated schematically in the drawing and is supported on the vacuum-side end wall of the power assist unit housing 4 holds the movable wall 7 in the illustrated starting position. In addition, a recuperating spring 27 is provided, which recuperating spring is arranged between the input element 12 and the retaining sleeve 20 and the force of which prestresses the valve piston 17 or rather its valve seat 16 with respect to the valve body 18.

In order to be able to connect the working chamber 8 to the atmosphere upon actuation of the control valve 13, an approximately radially extending duct 28 is finally embodied in the control valve housing 14. The return movement of the valve piston 17 at the end of a brake operation is limited in this case by means of a transverse element 29 that lies in the release position of the brake power assist unit illustrated in the drawing on a sliding ring seal 30 that guides the control valve housing 14 in the power assist unit housing 4 in a sealed manner. Alternatively, the transverse element 29 can also stop directly against the power assist housing unit 4.

The master cylinder 3, not illustrated in detail, which is fastened to the brake power assist unit 2 and comprises a housing 32 and at least one piston that can be displaced in a linear manner in said master cylinder, can by way of example be provided using a so-called plunger type of construction having sealing collars that are arranged fixed in position in the housing 32 and lie with a sealing lip against a piston wall for the purpose of sealing the pressure chambers.

The sealing lips of the sealing collars can be by-passed in the direction of the wheel brakes, not illustrated, in the event of a drop in pressure occurring between a pressure medium storage container 33, which is arranged on the master cylinder 3, and the wheel brakes.

Figure 2:
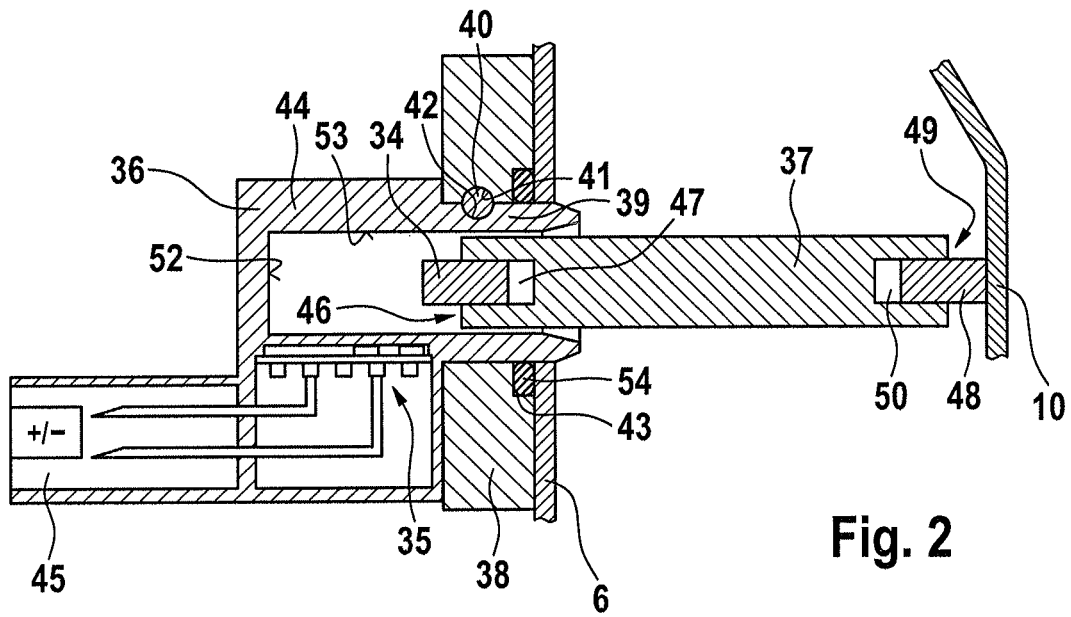
FIG. 2 illustrates a cross-sectional view of a first exemplary embodiment of a device in accordance with the invention.
Figure 3:
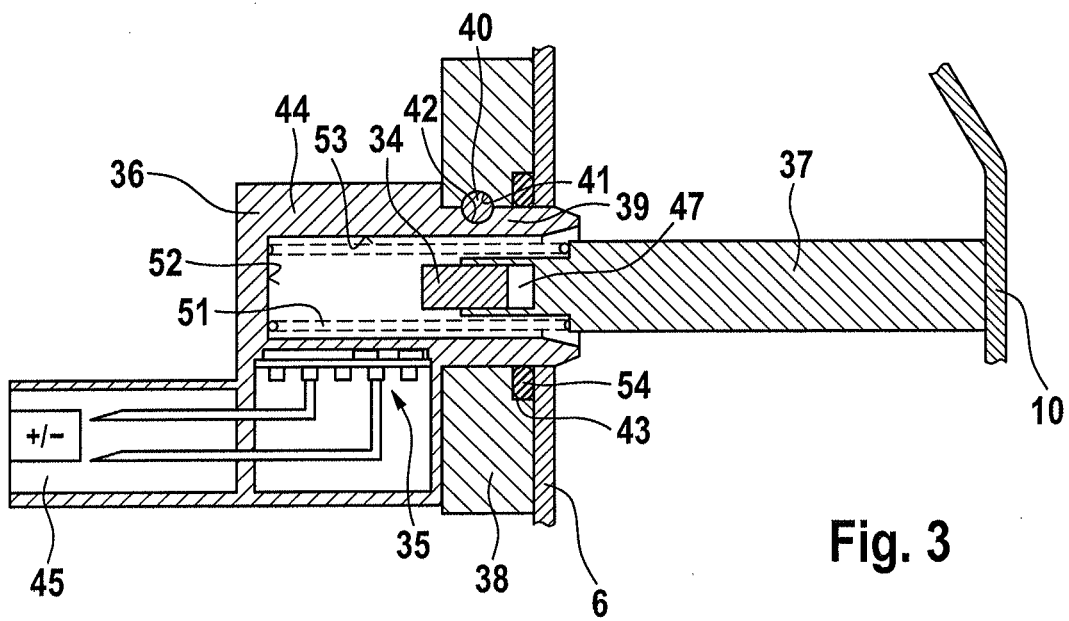
FIG. 3 illustrates a cross-sectional view of a second exemplary embodiment of a device in accordance with the invention.

FIGS. 2 and 3 illustrate in each case a cross-sectional view of a first exemplary embodiment of a device in accordance with the invention for monitoring the position and movement of a brake pedal for use within a servo-controlled brake system for motor vehicles, which device is primarily used to switch brake warning lights.

The device comprises a brake actuating unit 1 as is illustrated by way of example in FIG. 1 and described above.

A position indicator 34 is furthermore provided for monitoring the position and movement of the brake pedal, which position indicator transmits signals to a sensor element 35. The sensor element 35 can be connected to an electronic control unit, not illustrated.

In order to be able to replace the sensor element 35 and/or its housing 36 that is vacuum-tight and is made from a synthetic material, and also the position indicator 34 during a maintenance service without a large expenditure, the position indicator 35 in the case of the two exemplary embodiments illustrated in FIGS. 2 and 3 is provided on a support 37 that is coupled to the movement of the control valve housing 14 or to the movable wall 7 that is supported by the control valve housing 14, which support is guided in a guide shaft 53 of the housing 36 of a sensor element 35.

As is evident in FIGS. 2 and 3, the housing 36 of the sensor element 35 penetrates in a vacuum-tight manner the power assist unit housing 4 and/or the second housing half shell 6 of said housing and also a fastening flange 38 of the housing 32 of the master cylinder 3 having a first housing section 39.

A resilient holding pin 40 is provided for fastening the housing 36, which holding pin is inserted between the housing and the fastening flange 38. For this purpose, the fastening flange 38 and the first housing section 39 comprise respectively a cut-out 41, 42 that corresponds approximately to the half form of the holding pin 40, which cut-outs align when the housing 36 is installed. The housing 36 can therefore be dismantled in a simple manner and consequently also the position indicator 34 and/or the support 37 can be replaced without a large expenditure. It is also possible to use other suitable fastening means, for example a screw inter alia, in place of the holding pin.

As is evident in FIGS. 2 and 3, it is possible in order to seal the housing 36 to provide between the fastening flange 38 and the housing of the brake power assist unit a sealing ring that encompasses the housing 36, which sealing ring is arranged in a cut-out 43 of the fastening flange 38 and lies against surfaces of the first housing section 38, of the second housing half shell 6 and of the fastening flange 38.

Since the housing 36 of the sensor element 35 having a second housing section 44 protrudes out of the brake actuating unit 1 and the sensor element 35 is arranged in the second housing section 44, the connection to the electronic control unit can be produced in a simple manner, in that a plug connecter element 45 is embodied on the second housing section 44. Furthermore, the arrangement of the housing 36 of the sensor element 35 has proven to be optimal with regard to packaging.

A Hall sensor is provided as a sensor element 35 and a magnet is provided as a position indicator 34. However, it is also possible within the scope of the invention to implement the position sensing process using a different method, for example an optical method or an inductive method and to install corresponding components.

The magnet as a position indicator 34 is arranged on a first end 46 of the support 37 that is by way of example embodied from synthetic material and comprises a cut-out 47, in order to receive the magnet 34 by means of a pressed connection. This arrangement has the advantage that component tolerances can be easily compensated for and the magnet 34 can be fastened in the support 37 in a simple manner.

The differences between the two exemplary embodiments in accordance with FIGS. 2 and 3 are mentioned hereinunder: In accordance with the first exemplary embodiment of the invention illustrated in FIG. 2, the movement of the position indicator 34 is coupled to the movement of the membrane disk 10 of the movable wall 7. In this case, a further magnet 48 is provided that is arranged on a second end 49 of the support 37 in a cut-out 50 and is connected to the support 37 likewise by means of a pressed connection. This arrangement additionally improves the process of compensating for the component tolerances. On the basis of which, the tolerances of the individual components can be significant, which in turn leads to an optimization of the costs.

The magnets 34, 48 are constructed identically, so that the support 37 can be installed in a symmetrical manner. It is therefore impossible to mount the support 37 incorrectly.

The alternative exemplary embodiment illustrated in FIG. 3 provides that a return spring 51 is provided for coupling the movement of the position indicator 34, which return spring pre-stresses the support 37 against the movable wall 7. The return spring 51 is supported at one end on a floor 52 of the guide shaft 53 of the housing 36 of the sensor element 35 and at the other end on the support 37 and/or at a shoulder that is provided on the support 37.

Figure 4:
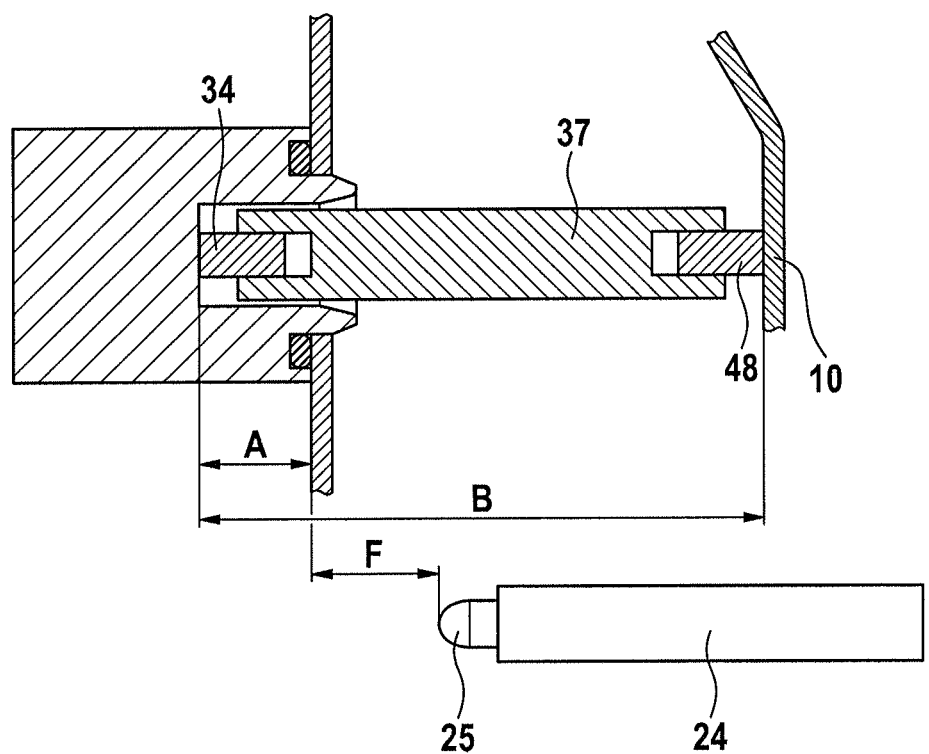
FIG. 4 illustrates the cross-sectional view of the first exemplary embodiment in accordance with FIG. 2 in the case of the adjustment of the magnet positions on the support.

FIG. 4 illustrates the cross-sectional view of the first exemplary embodiment in accordance with FIG. 2 in the case of the adjustment of the magnet positions on the support 37. While a functional dimension F is determined and adjusted between the mushroom-shaped head 25 and the power assist housing unit 4 and/or the second housing half shell 6, the values for the gaps A and B illustrated in FIG. 4 are also measured. As is evident in FIG. 4, the gap A represents the distance between the magnet as position indicator 34 and the second housing half shell 6. The gap B represents the distance between the magnet as position indicator 34 and the membrane disk 10.

After the values of A and B have been determined, they are both correspondingly adjusted by displacing the two magnets 34, 48 in the support 37. This adjustment reduces the tolerances of the switching points of the sensor element 35.

Further alternative exemplary embodiments, not illustrated, provide that the movement of the position indicator 34 is coupled to the movement of the control valve housing 14. The further magnet 48 and/or the support 37 that is pre-stressed by the return spring 51 lies directly on the control valve housing 14.

In order to implement the coupling of the further magnet 48 to the control valve housing 14 that is embodied from a synthetic material, a metal element is provided on said control valve housing.

All described exemplary embodiments comprise the advantages that the housing 36 and also the position indicator 34 can be replaced during a maintenance service and small switching tolerances are created as a result of adjusting the magnet position. Furthermore, only a few components and only simple components are required for the brake light switch function, which components are easy to assemble. In addition, the components can comprise significant tolerances.

LIST OF REFERENCE NUMERALS

1. Brake actuating unit
2. Brake power assist unit
3. Master cylinder
4. Power assist unit housing
5. First housing half shell
6. Second housing half shell
7. Movable wall
8. Working chamber
9. Vacuum chamber
10. Membrane disc
11. Membrane
12. Input element
13. Control valve
14. Control valve housing
15. First seal seat
16. Second seal seat
17. Valve piston
18. Valve body
19. Valve spring
20. Retaining sleeve
21. Duct
22. Reaction disc
23. Head flange
24. Push rod
25. Mushroom-shaped head
26. Return spring
27. Recuperating spring
28. Duct
29. Transverse element
30. Sliding ring seal
31. Rolled fold
32. Housing
33. Pressure medium storage container
34. Position indicator
35. Sensor element
36. Housing 37. Support
38. Fastening flange
39. Housing section
40. Holding pin
41. Cut-out
42. Cut-out
43. Cut-out
44. Housing section
45. Plug connector element
46. End
47. Cut-out
48. Magnet
49. End
50. Cut-out
51. Return spring
52. Floor
53. Guide shaft
54. Sealing ring

The invention claimed is:

1. A device for monitoring the position and movement of a brake pedal for use within a brake system for motor vehicles, comprising:
a brake actuating unit having a brake power assist unit having a power assist unit housing that is divided into at least one vacuum chamber and at least one working chamber by at least one axially movable wall which can be influenced by a pneumatic differential pressure, wherein the movable wall is embodied as a membrane disk, which is supported on a control valve housing, and a membrane that lies on said membrane disk, and said brake actuating unit having a master cylinder that is fastened to the brake power assist unit and comprises a housing and at least one piston which can be displaced in a linear manner in said master cylinder, and a position indicator for monitoring the position of the brake pedal, which position indicator transmits signals to a sensor element that can be connected to an electronic control unit, wherein the position indicator is provided on a support that is coupled to the movement of the control valve housing or to the movable wall that is supported by the control valve housing, which support is guided in a housing of the sensor element, and wherein the housing of the sensor element penetrates in a vacuum-tight manner the power assist unit housing and the housing of the master cylinder having a first housing section.

2. The device as claimed in claim 1, wherein the housing of the sensor element is provided fastened to the housing of the master cylinder by a fastening means in such a manner that it can be dismantled.

3. The device as claimed in claim 2, wherein a holding pin is provided as the fastening means.

4. The device as claimed in claim 1, wherein for sealing purposes a sealing ring that encompasses the housing of the sensor element is provided between the housing of the master cylinder and the power assist unit housing.

5. The device as claimed in claim 1, wherein the housing of the sensor element, which housing comprises a second housing section, protrudes out of the brake actuating unit, wherein the sensor element is arranged in the second housing section, on which a plug connector element is formed in order to provide the connection to the electronic control unit.

6. The device as claimed in claim 1, wherein a Hall sensor is provided as the sensor element and a magnet is provided as the position indicator.

7. The device as claimed in claim 6, wherein the magnet is arranged on a first end of the support and is connected to the support by means of a pressed connection.

8. The device as claimed in claim 1, wherein the movement of the position indicator is coupled to the movement of the membrane disk of the movable wall.

9. The device as claimed in claim 8, wherein a metal element is provided on the control valve housing for coupling to the further magnet.

10. The device as claimed in claim 8, wherein the movement of the position indicator is coupled to the movement of the control valve housing.

11. The device as claimed in claim 1, wherein a further magnet is provided for coupling the movement of the position indicator, which magnet is arranged on a second end of the support and is connected to the support by a pressed connection.

12. The device as claimed in claim 1, wherein a return spring is provided for coupling the movement of the position indicator, which return spring pre-stresses the support against the control valve housing or the movable wall that is supported by the control valve housing.

13. The device as claimed in claim 12, wherein the return spring is supported at one end on a floor of a guide shaft of the housing of the sensor element and at the other end on the support.

* * * * *